March 26, 1935.   A. G. LAUCK   1,995,391
APPARATUS FOR CIRCULATING MOLTEN GLASS
Filed Dec. 19, 1932   4 Sheets-Sheet 1
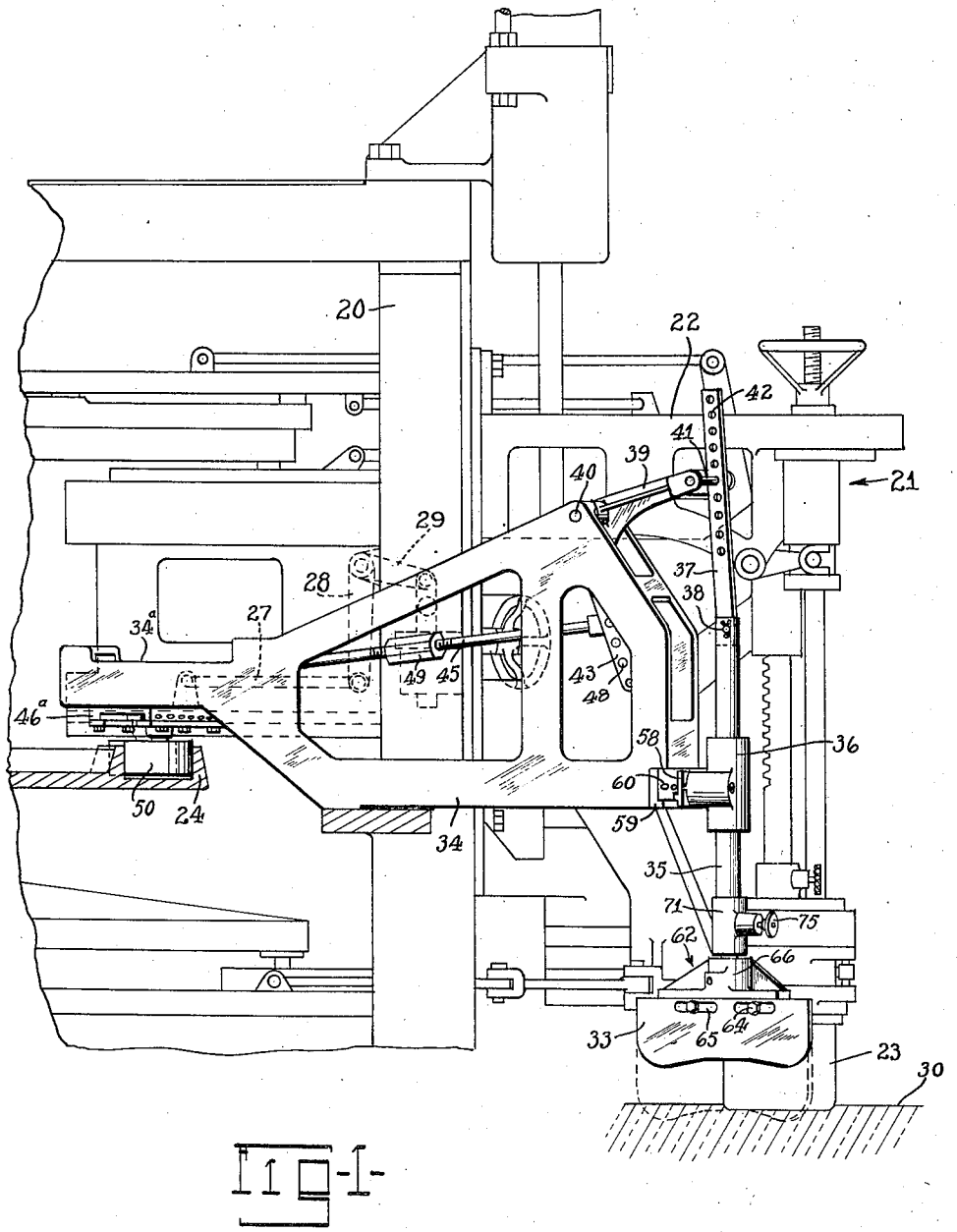
Inventor
Albert G. Lauck
By
J. F. Rule
Attorney

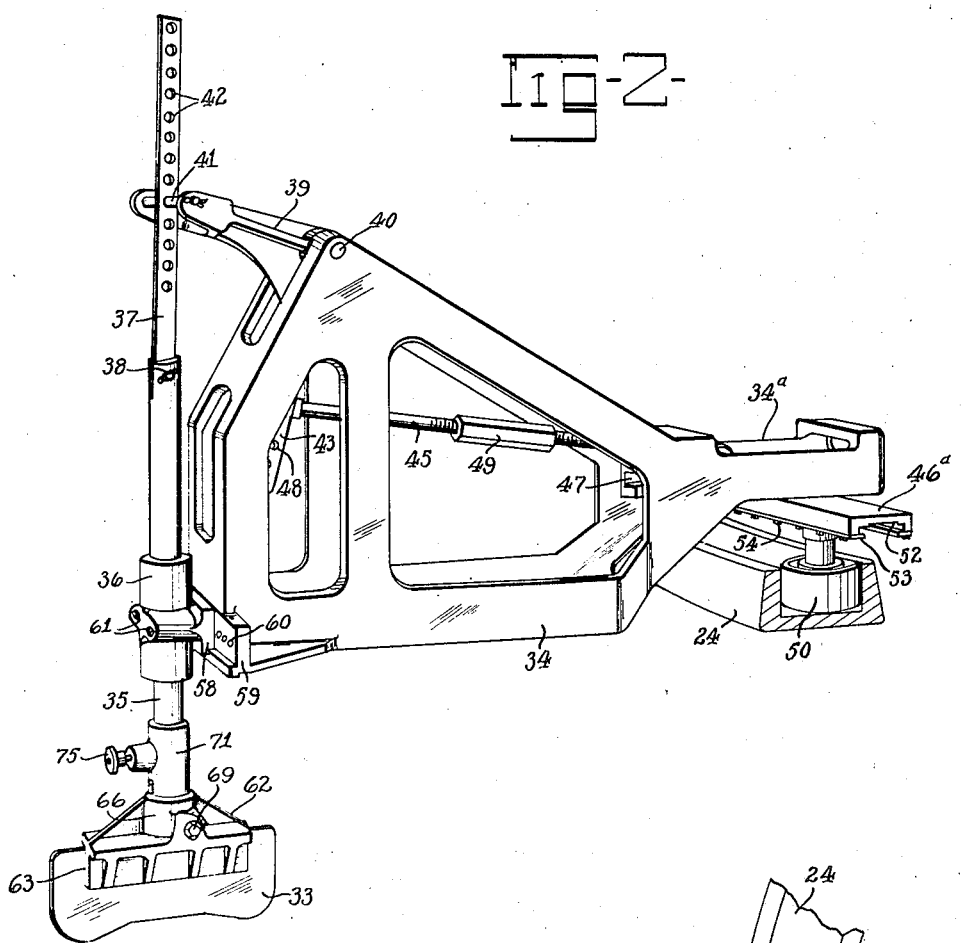
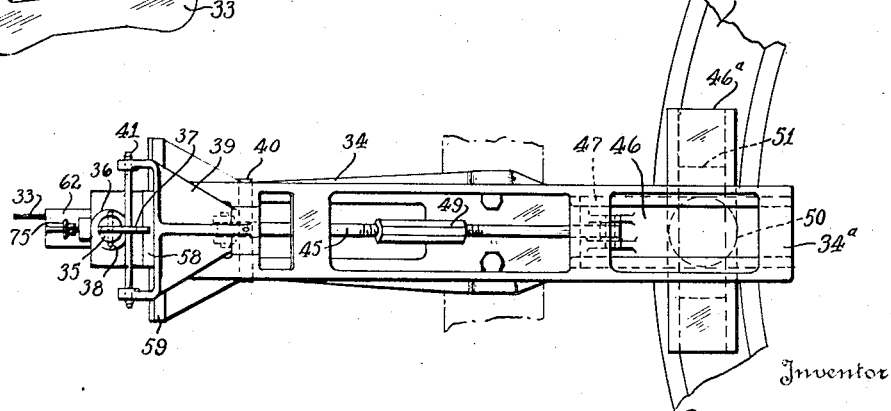

March 26, 1935.  A. G. LAUCK  1,995,391
APPARATUS FOR CIRCULATING MOLTEN GLASS
Filed Dec. 19, 1932  4 Sheets-Sheet 3
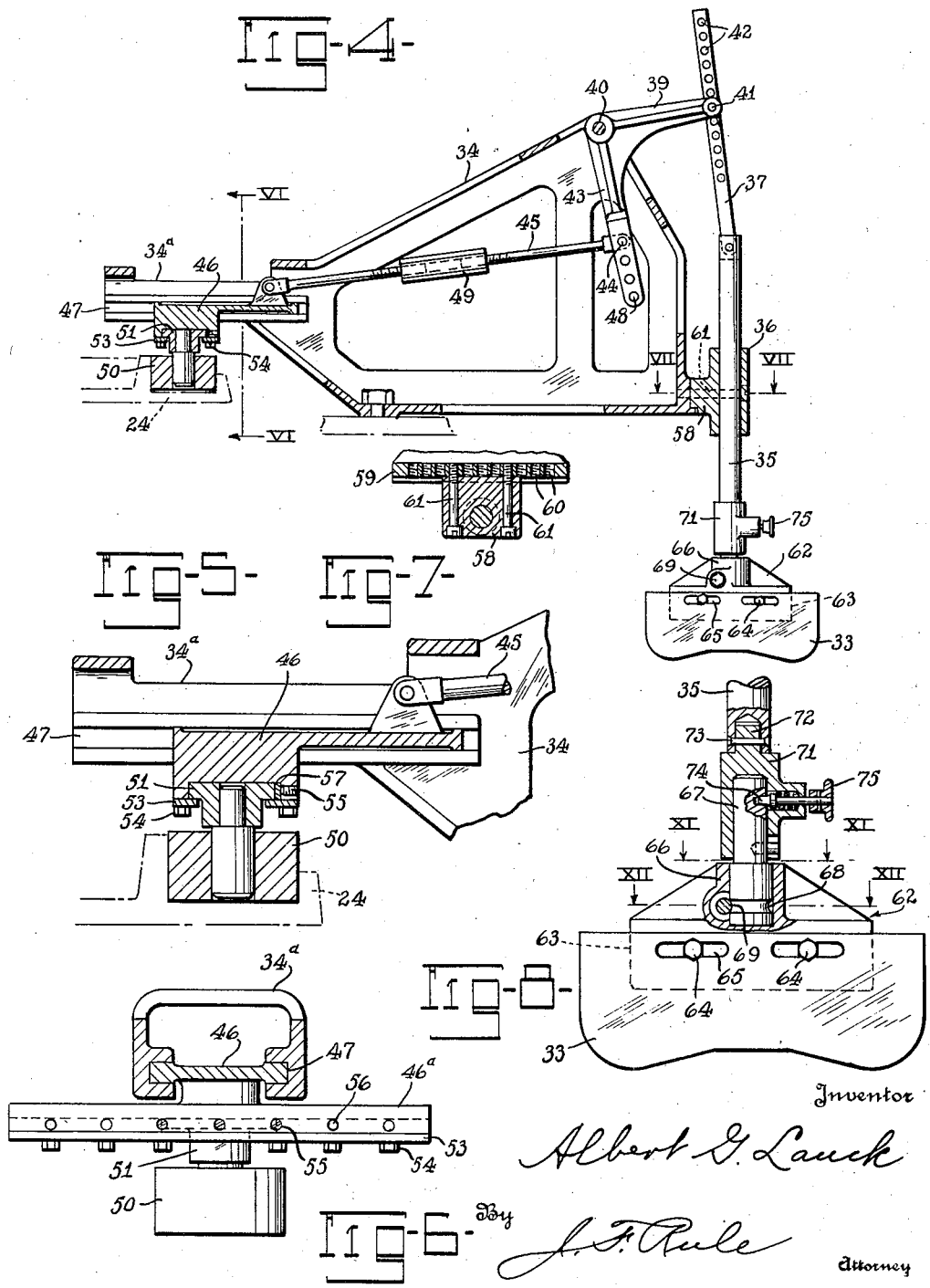

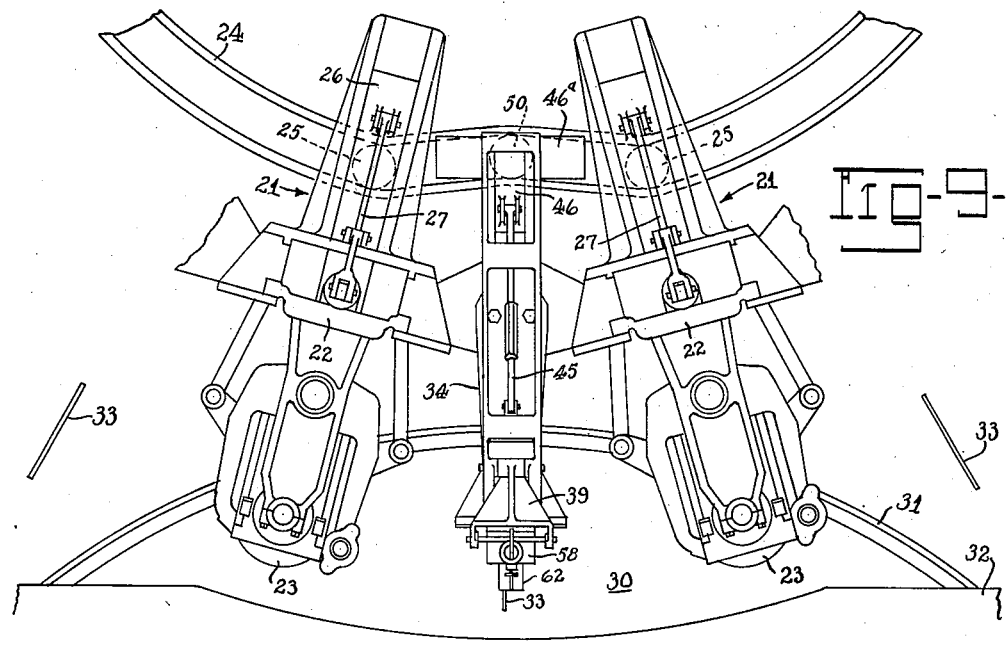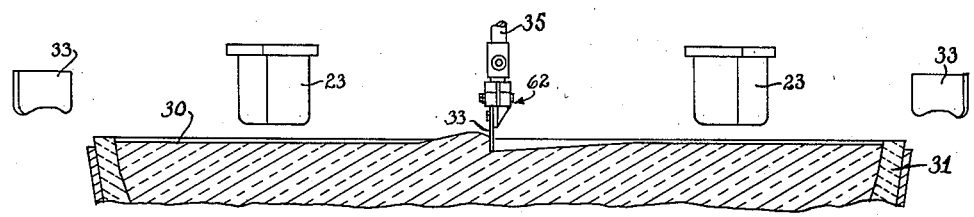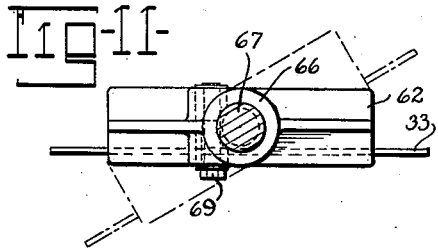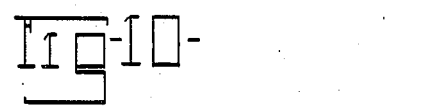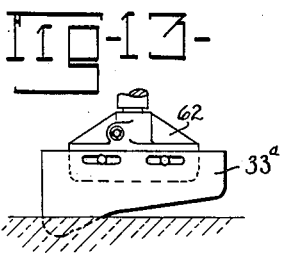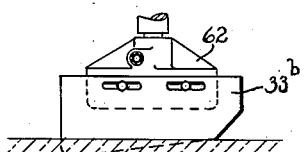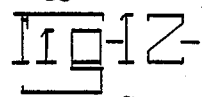

Patented Mar. 26, 1935

1,995,391

UNITED STATES PATENT OFFICE 1,995,391

APPARATUS FOR CIRCULATING MOLTEN GLASS

Albert G. Lauck, Alton, Ill., assignor to Owens-Illinois Glass Company, a corporation of Ohio Application December 19, 1932, Serial No. 647,935

5 Claims. (Cl. 49—5)

My invention relates to apparatus for causing a circulation or movement of molten glass across a gathering area at which portions of the glass are gathered or removed. More particularly, the invention in its preferred form relates to a paddle or skimmer device mounted upon and forming part of a glass blowing machine of the suction gathering type in which the traveling molds dip in succession into a pool of molten glass and gather their charges of glass by suction.

At the present time, machines generally of the suction gathering type gather their charges from revolving pots or tanks containing the molten glass. The pots are rotated for the purpose of carrying away from the gathering area the portions of glass which have been chilled by contact with the gathering molds, the glass severing knives, and by exposure to the air, so that glass of a uniform high temperature may be continuously supplied to the molds. The use of rotating pots has various objections and drawbacks, among which may be mentioned the requirement of a large amount of fuel to maintain the glass at the necessary high temperature, the difficulties connected with maintaining a uniform and constant temperature over the gathering area, the cost of providing and maintaining rotating pots with their operating mechanism, and the comparatively large amount of space required.

An object of the present invention is to provide practical means associated with the glass molding or forming machine and comprising a part thereof for maintaining an adequate circulation of glass in a stationary pot or forehearth of a tank, whereby the use of a rotating pot is rendered unnecessary and the above objections obviated.

Other objects of the invention will appear hereinafter.

In the accompanying drawings:

Figure 1 is a sectional elevation showing part of a glass molding machine with the present invention applied thereto.

Fig. 2 is a perspective view of a skimmer plate or paddle and its operating mechanism.

Fig. 3 is a plan view of the same.

Fig. 4 is a sectional elevation of the mechanism shown in Fig. 2.

Fig. 5 is an enlarged detail view showing a portion of the mechanism for lifting and lowering the paddle.

Fig. 6 is a section at the line VI—VI on Fig. 4.

Fig. 7 is a section at the line VII—VII on Fig. 4.

Fig. 8 is a part sectional elevation showing the paddle and the mechanism by which it is attached to the paddle shaft.

Fig. 9 is a diagrammatic plan view showing two mold units and associated paddles, and the forehearth therebeneath.

Fig. 10 is a partly diagrammatic elevation of the parts shown in Fig. 9.

Fig. 11 is a section at the line XI—XI on Fig. 8.

Fig. 12 is a section at the line XII—XII on Fig. 8.

Figs. 13 and 14 are views showing modified forms of the paddle.

In Figure 1, I have shown a head or unit of a suction gathering machine of the Owens type together with a paddle or skimmer plate and its actuating mechanism mounted on the machine carriage and forming a part of said machine. The machine comprises a mold carriage 20 which may be rotated continuously about a vertical axis. Mounted on the carriage is an annular series of mold carrying heads or units 21. Each unit comprises a dip frame 22 which supports a blank mold 23. The dip frame may be lifted and lowered, as usual, by means of a stationary dip cam 24. Each unit comprises a cam roll 25 (Fig. 9) running on the cam 24 and having operating connections with the dip frame, said connections including a slide block 26, link 27 and lever arms 28, 29 (Fig. 1). The cam 24 operates through said connections for lowering and lifting the frame 22, thereby lowering and lifting the mold 23 into and out of a pool 30 of molten glass. The pool 30, as shown, is contained in a stationary forehearth 31 of a furnace tank 32. The parts above identified by means of reference numerals may be of usual construction as found, for example, in commercial machines of the Owens type and form no part of the present invention, except in combination with parts hereinafter described.

In accordance with my invention the machine is provided with traveling skimmer plates or paddles 33 which are arranged to dip into the pool of glass 30 as they travel over the forehearth. These paddes serve as skimmers and assist in circulating the glass past the gathering area and removing chilled portions of glass, all as more fully pointed out hereinafter. The number of paddles 33 may, if desired, be equal to the number of mold heads on the machine, a paddle being arranged between each two adjoining mold heads. I have found, however, that satisfactory results may be obtained on some machines with a smaller number of paddles, depending on the size of the molds, number of molds on the machine, speed of rotation of the mold carriage, and other variable factors.

Each paddle unit comprises a supporting frame 34 which may be a casting approximately triangular in shape mounted on the mold carriage. The paddle 33 is carried at the lower end of a vertically disposed shaft 35 which extends through a bearing sleeve 36 adjustably supported on the frame 34, as hereinafter set forth. Extending upward from the shaft 35 is a bar 37 having a pivotal connection 38 with said shaft. A bell crank 39 fulcrumed at 40 on the frame 34, comprises an arm extending forward from the fulcrum and connected to the bar 37 by means of a pin 41 extending through one of a series of holes 42 in the bar 37. The holes 42 provide for vertical adjustment of the paddle.

The bell crank 39 includes a depending arm 43 having a pivotal connection 44 with a rod 45 which extends rearwardly or inwardly toward the center of the machine and is pivotally connected at its inner end to a slide block 46. The latter is mounted to reciprocate radially of the machine in guideways 47 formed on an arm 34ª of the frame 34. The arm 43 is provided with a series of holes 48 permitting the connection of the rod 45 to be adjusted toward and from the fulcrum 40 to thereby adjustably vary the distance through which the paddle moves up and down under the control of its cam, as hereinafter set forth. The rod 45 is provided with a turnbuckle 49 which provides for adjusting the angular position of the bell crank 39 and thus permits a fine adjustment vertically of the paddle 33.

The slide block 46 is under the control of the stationary dip cam 24, through connections including a cam roll 50 running on said cam. The roll 50 is carried by a block 51 (Figs. 4, 5 and 6) adjustably mounted on the lower side of the slide block 46. The latter is formed on its under face with a recess 52 (Fig. 2) to receive the block 51. Holding strips 53 attached to the slide block 46 as by means of bolts 54, engage beneath flange portions formed on the block 51 for supporting the latter. The slide block 46 includes integral arms 46ª extending in a direction transverse to the radius of the machine, and said recess 52 is extended along the under surface of said arms to permit adjustment of the block 51 lengthwise thereof. The block 51 is held in its adjusted position by set screws 55 (Figs. 5 and 6) which are threaded in openings 56. When the block 51 has been adjusted to the desired position, the screws 55 are set up against the block or against a clamping strip 57 by which the block 51 is clamped in its adjusted position. It will be seen that this adjustment determines the points at which during the rotation of the mold carriage the cam 24 operates to lower and lift the paddle into and out of the glass.

Referring to Figs. 2, 4 and 7, it will be seen that the bearing sleeve 36 is adjustable horizontally in the direction of its travel with the mold carriage. The bearing sleeve has connected thereto or formed integral therewith a slide block 58 slidably supported on a face plate 59 formed on the frame 34. Said face plate is provided with a series of screw threaded openings 60 (see Fig. 7) to receive clamping bolts 61 which extend through openings in the block 58. Adjustment of the bearing sleeve 36 by means of the construction just described, permits the paddle to be adjusted toward or from the adjacent mold with which it cooperates. The pivot pin 41 is of sufficient length to permit bodily adjustment of the bar 37 along with the paddle shaft 35 when the latter is adjusted in the manner just described.

The paddle 33 is removably supported on the shaft 35 by means of the construction which will now be described. The paddle is in the form of a flat plate removably secured to a shank or connecting head 62, the latter comprising a vertical web 63 against which the paddle bears. Clamping bolts 64 extend through elongated slots 65 in the plate 33 and are threaded into the web 63, thus permitting adjustment of the paddle in the direction of its length. The head 62 is formed with a socket 66 (Fig. 8) to receive the lower end of a connecting pin 67. The pin 67 is formed with an annular groove 68 in which a clamping bolt 69 (Fig. 12) engages. A locking nut 70 cooperates with said bolt to clamp the head 62 and pin 67 together with the head in any position of rotative adjustment relative to said pin. The pin 67 extends upward into a socket formed in a shaft section 71, the latter formed with a stud 72 extending upward into a socket formed in the lower end of the shaft 35 and secured therein by a pin 73. The pin 67 is removably held in position within the shaft section 71 by means of a spring actuated detent 74 which may be withdrawn by means of a handle 75 to permit disconnection and removal of the paddle from its shaft.

The operation is as follows: The mold carriage is rotated continuously about a vertical axis, thereby causing the molds 23 to travel in succession over the forehearth 31. As each mold is brought to position over the forehearth, the stationary cam 24 operates through the connections 27, 28, 29 (Fig. 1) to lower the dip frame 22 carrying the mold. The mold is thus lowered to gathering position in contact with the pool of glass 30 and while it travels in contact with the glass, gathers its charge by suction. The cam 24 then operates to lift the mold out of dip. The paddle 33 which travels with the mold carriage in advance of the mold 23 is also under the control of the cam 24 and is lowered thereby so that it dips beneath the surface of the glass while it travels across the gathering area, as shown in Fig. 10. The paddle as it moves through the glass causes a movement of the glass through the forehearth. The surface portion of the glass is skimmed off or forced to move from the forehearth back into the main tank. The portions of glass chilled by exposure to the air and by contact with the mold and the usual cut-off knife, are thus removed, so that unchilled glass is presented to the molds as they gather their charges. The propelling action of the paddle is not confined to the surface layers of glass, but extends to the substrata, promoting the flow of substantially the entire body of glass in the forehearth.

The paddles 33, as shown in Fig. 9, are arranged to extend in a direction radial to the mold carriage. They may, however, be adjusted to different angles, as shown, for example, in Fig. 11. It is found in practice that by adjusting the paddle to an angle such that the inner end thereof, namely, the end nearest the center of the mold carriage, is in advance of the outer end, the paddle will tend to deflect or plow the glass away from the outer rim of the forehearth and toward the tank. This serves to counteract and overcome the tendency of the glass near the rim of the forehearth to become chilled to a greater extent than that nearer the tank.

The shape of the paddle or skimmer plate may be modified in accordance with the particular results desired. Fig. 13 shows a modified form of skimmer plate 33ª in which one end of the plate is substantially deeper than the other. With this construction, one end only of the plate dips into the glass. This may be the inner end of the plate which operates, therefore, on the glass adjacent the rim of the forehearth and thereby prevents excessive chilling of this portion of the glass which would otherwise take place.

Fig. 14 shows another modified form of skimmer plate 33b. The plate in this form has its lower edge inclined in a substantially straight line so that the plate dips beneath the surface of the glass along substantially the entire length of the plate, but deeper at one end than at the other.

Various modifications may be resorted to within the spirit and scope of my invention.

What I claim is:

1. A machine for forming glass articles comprising, in combination, a mold carriage rotatable about a vertical axis, dip frames mounted on the carriage, molds carried by the dip frames, means for lowering the dip frames in succession to bring the molds into contact with a supply body of molten glass, a skimmer plate mounted on the mold carriage between two adjacent dip frames, means for lowering the skimmer plate into the glass, the downward movement of the skimmer plate being separate from that of either of said adjacent dip frames, and a stationary cam common to said dip frames and skimmer plate and controlling their up and down movements.

2. The combination of a horizontally moving mold carriage, a skimmer plate, a supporting frame for said plate mounted on the mold carriage, a vertically disposed shaft carrying said plate, a bell crank pivoted on said frame, means connecting the bell crank with said shaft, a stationary cam, operating connections between the cam and bell crank, said connections comprising a slide block mounted to reciprocate in a direction transverse to the cam, and a cam roll running on said cam and having connection with said slide block, and means for adjusting the cam roll relative to the slide block in a direction lengthwise of the cam and thereby adjusting the time at which during the travel of the mold carriage said cam operates to lower the skimmer plate.

3. The combination of a mold carriage rotatable about a vertical axis, dip frames on the carriage, molds carried by the dip frames, means for lowering the dip frames in succession and thereby lowering the molds into position to gather charges from a supply body of molten glass, a skimmer plate interposed between two adjacent dip frames, a supporting frame for the plate mounted upon said carriage between the two adjacent dip frames, a vertical shaft connected at its lower end to the plate and mounted for vertical sliding movement in said supporting frame, a bearing sleeve for the shaft mounted for adjustment on said supporting frame in the direction of the path of travel of the molds, a bell crank lever mounted for rocking movement about a horizontal axis, means connecting one arm of said lever to the upper end of the shaft, a slide block, means connecting the slide block and the other arm of said bell crank lever, a cam roller on said block, and a stationary cam adapted to move the slide block and dip frames.

4. The combination of a mold carriage rotatable about a vertical axis, dip frames on the carriage, molds carried by the dip frames, means for lowering the dip frames in succession and thereby lowering the molds into position to gather charges from a supply body of molten glass, a skimmer plate interposed between two adjacent dip frames, a supporting frame for the plate mounted upon said carriage between the two adjacent dip frames, a vertical shaft connected to the plate and mounted for vertical sliding movement in said supporting frame, a bell crank lever mounted for rocking movement about a horizontal axis, means connecting one arm of said lever to the upper end of the shaft, a slide block, means connecting the slide block and the other arm of said bell crank lever, a cam roller on said block, a stationary cam adapted to move the slide block and dip frames, and means whereby said cam roll may be adjusted in a direction at right angles to the path of sliding movement of the block to thereby advance or retard the point at which vertical movement is imparted to the skimmer plate.

5. The combination of a mold carriage rotatable horizontally, dip frames on the carriage, molds carried by the dip frames, means including a stationary cam for lowering the dip frames in succession and thereby lowering the molds into position to gather charges from a supply body of molten glass, a skimmer plate or paddle interposed between two adjacent dip frames, a frame mounted on the mold carriage and supporting the skimmer plate, automatic means actuated by said cam for lowering and lifting the skimmer plate into and out of the glass, and means for adjusting the paddle on its frame to thereby change the distance between the paddle and the adjoining mold.

ALBERT G. LAUCK.